(No Model.)
L. LEITCH.
BREAD RAISER.
No. 530,231. Patented Dec. 4, 1894.
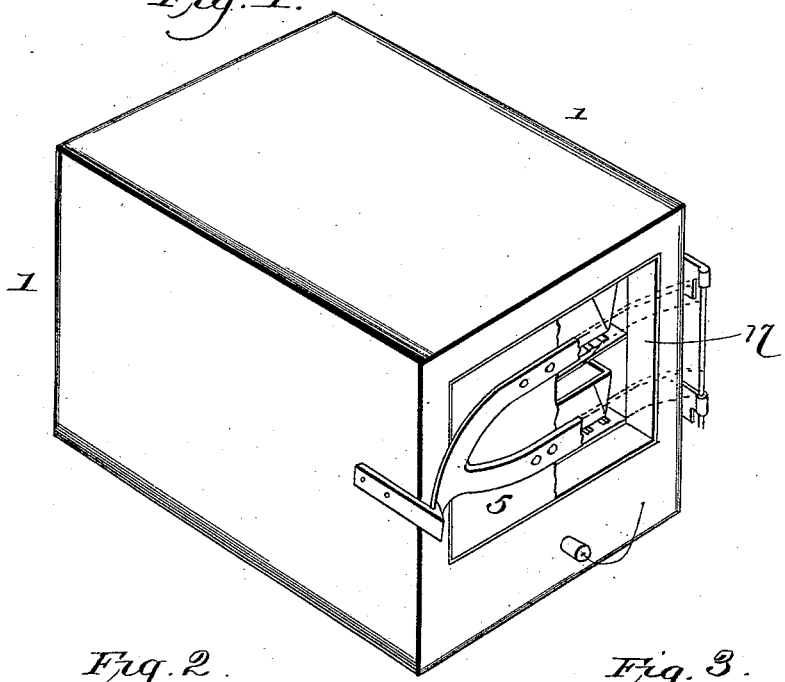
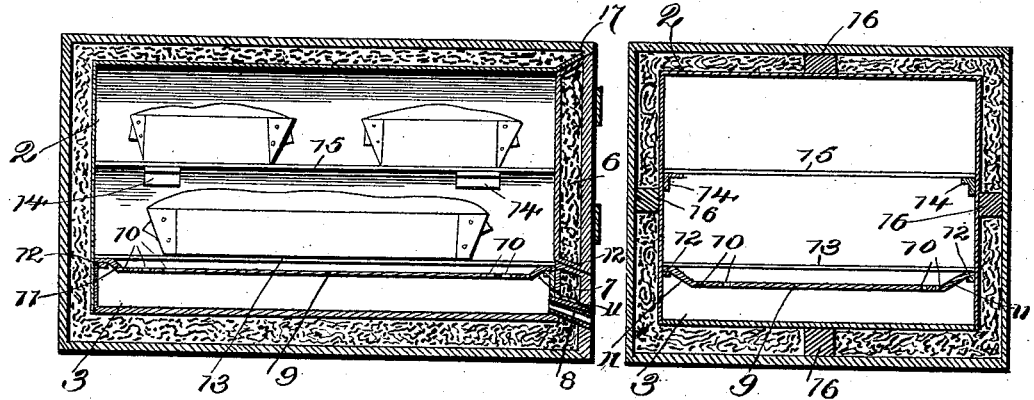
Witnesses
J. W. Reynolds
Chas. S. Hyer
Inventor
Langhorne Leitch.
By John Wedderburn
Attorney

# UNITED STATES PATENT OFFICE.

LANGHORNE LEITCH, OF BOSWELL, VIRGINIA.

BREAD-RAISER.

SPECIFICATION forming part of Letters Patent No. 530,231, dated December 4, 1894.

Application filed February 23, 1894. Serial No. 501,235. (No model.)

*To all whom it may concern:*

Be it known that I, LANGHORNE LEITCH, a citizen of the United States, and a resident of Boswell, in the county of Cumberland and State of Virginia, have invented certain new and useful Improvements in Bread-Raisers; and I do hereby declare the following to be a full, clear, and exact description of the invention, such as will enable others skilled in the art to which it appertains to make and use the same.

This invention relates to bread raisers, and has for its object to provide a hot water chamber for raising yeast batter or dough, wherein humid heated air is sustained at a proper degree of temperature.

With these and other objects in view, the invention consists of the construction and arrangement of the several parts which will be more fully hereinafter described and claimed.

In the drawings: Figure 1 is a perspective view of an improved bread raiser embodying the invention, showing one-half of the door removed. Fig. 2 is a central longitudinal section of the device. Fig. 3 is a transverse vertical section of the same.

Similar numerals of reference are employed to indicate corresponding parts in the several views.

Referring to the drawings, the numeral 1 designates the outer casing which is preferably made of wood, and has at a suitable distance therefrom an inner casing 2 of sheet metal, preferably tin, and at the lower portion the tin is preferably replaced by zinc or analogous non-corrosive metal to provide a water reservoir 3. A space is left between the inner and outer casings which is packed with heat non-conducting material, and at one end or side the device is supplied with a door 5, said door being in like manner formed with inner and outer walls or casings and supplied with an interior packing of non-conducting material as at 6. The lower front portion of the raiser is closed as at 7 and forms the front wall of the reservoir and has extending through the same a metallic tube 8 which is supplied with a suitable cut-off or stopper and which is employed to drain the water reservoir of its contents. Within the water reservoir hot water is adapted to be placed and immediately above the said water is a cover 9 which is perforated near the sides as at 10 or any other suitable parts and having raised edges 11 resting on ledges 12. On the said ledges 12 is also supported a shelf 13, and above the said ledges 12 at a suitable distance, are other ledges 14 upon which rests a shelf 15. The door heretofore set forth is fitted with springs, as shown, in order to press closely upon the face of the raiser, and to accomplish this object any other suitable construction may be employed. At suitable intervals between the inner and outer casings of the walls of the reservoir and to strengthen and reinforce the same are mounted wooden strips 16, as clearly shown in Fig. 3, to hold the inner case firmly in place to prevent the outer or inner walls from being readily bent or indented, as will be readily understood. The opening for the door is preferably beveled, as in the drawings, but may be straight if so desired, or the front of the raiser above reservoir except upper end of outer case may extend no farther than the inner case in front of the reservoir, thus allowing the door to press flatly upon this whole front above the reservoir, and upon the surface of contact with the door or portion thereof is suitably fitted a strip 17 of felt or other non-conducting and slightly elastic material to provide a close joint between the door and the bread raiser. The shelves are grated or may be of other perforate form and thereon are placed the pans of dough or batter.

If desired, the inner case only may be closed at the bottom around the reservoir and in this change the tube for draining the water reservoir should also be arranged differently and the door would cover the whole front of the bread raiser except the upper and lower ends of the outer case.

If desired, the reservoir may be formed by a removable pan with a perforate cover, sitting on the bottom of the inner case of the reservoir, the said pan having a tube at the bottom through the front side for drawing off the water. It will be understood that the tube may be changed either from the one side of the raiser or the other without departing from the spirit of the invention, and the perforate cover over the reservoir may be made without raised edges if so desired, and rest upon the separate ledges prepared for it. The door may vary as to size or form, may cover the whole front of the raiser above the reservoir, except the upper end of the outer case, and may be hinged at the top or bottom or may be made to slide into place, provided in all instances it shall be fitted with springs to press upon the door to force it upon the face of the bread raiser, and the springs may assume any other convenient form than the one indicated.

In use very hot or boiling water is poured into the reservoir, more or less in quantity in relation to the size of the bread raiser, a short time before it is desired to place the dough or batter within the device, to warm up the interior of the raiser to the proper temperature, the door of course, being closed. The temperature is such as to effect the raising of the dough and the slight lowering of the temperature after the bread has begun to rise will be beneficial to prevent souring of the dough when set to rise over night. The moist vapor rising through the perforate cover over the reservoir will prevent the formation of a dry skin or crust on the surface of the dough while rising. After using the reservoir about ten hours it is better to change the water by drawing it off through the discharge tube and pouring in a quantity of fresh hot water at the front of the reservoir. In very warm weather or climates, by using cool water or a little ice the raiser may be made a cool air chamber for raising yeast batter or dough.

It is obviously apparent that many changes in the proportion, form and manner of construction might be substituted for those shown and described without in the least departing from the nature or spirit of the invention.

Having thus described the invention, what is claimed as new is—

In a bread raiser, the combination of an outer wooden wall, an inner metallic wall, a heat non-conducting filling between the said walls, a door of similar form provided with a packing of heat non-conducting material, a lower water reservoir, a perforate cover for the said reservoir, a discharge tube in the said reservoir, shelves above the reservoir and a spring hinge secured to the door and extending across the same and at one end having a nose thereon to engage a catch, substantially as and for the purposes specified.

In testimony whereof I have signed this specification in the presence of two subscribing witnesses.

LANGHORNE LEITCH.

Witnesses:
RD. E. RICHARDSON,
A. L. RICHARDSON.